United States Patent
Nachbur et al.

[11] 3,800,010
[45] Mar. 26, 1974

[54] PHOSPHONOPROPIONIC ACID AMIDE DERIVATIVES

[75] Inventors: Hermann Nachbur, Dornach; Arthur Maeder, Therwil, both of Switzerland

[73] Assignee: Ciba-Geigy AG, Basel, Switzerland

[22] Filed: Feb. 4, 1971

[21] Appl. No.: 112,769

[30] Foreign Application Priority Data
Feb. 6, 1970 Switzerland.......................... 1775/70

[52] U.S. Cl........... 260/943, 106/15 FP, 260/45.7 P, 260/45.7 PS, 424/211
[51] Int. Cl............................ C07f 9/40, C08f 45/58
[58] Field of Search..................................... 260/943

[56] References Cited
UNITED STATES PATENTS
3,259,540   7/1966   Pianka et al.................... 260/943 X

*Primary Examiner*—Anton H. Sutto
*Attorney, Agent, or Firm*—Joseph G. Kolodny; Stanley A. Marcus

[57] ABSTRACT

The subject of the invention are phosphonopropionic acid amide derivatives of the formula (1)

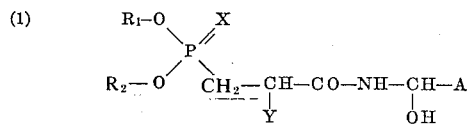

wherein $R_1$ and $R_2$ each denote an alkyl, halogenoalkyl or alkenyl radical with up to 4 carbon atoms each, X denotes a sulphur atom or preferably an oxygen atom, Y denotes a methyl group or preferably a hydrogen atom and A denotes a halogenated alkyl radical. These compounds are made by reacting the corresponding phosphonopropionic acid amide with the corresponding halogenoaldehyde. The compounds are used as flameproofing agents for fibers or in plastics or they serve as intermediates for the manufacture of other valuable compounds.

11 Claims, No Drawings

PHOSPHONOPROPIONIC ACID AMIDE DERIVATIVES

The subject of the invention are phosphonopropionic acid amide derivatives of the formula (1) 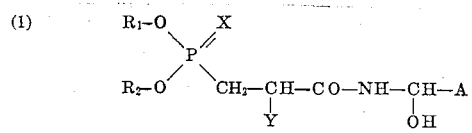

wherein $R_1$ and $R_2$ each denote an alkyl, halogenoalkyl or alkenyl radical with up to 4 carbon atoms each, X denotes a sulphur atom or preferably an oxygen atom, Y denotes a methyl group or preferably a hydrogen atom and A denotes a halogenated alkyl radical.

In particular, these compounds are phosphonopropionic acid derivatives of the formula (2) 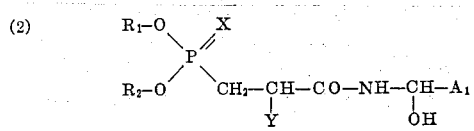

wherein $A_1$ denotes a polyhalogenated alkyl radical with 1 to 4 carbon atoms and $R_1$, $R_2$, X and Y have the indicated meaning.

Amongst these phosphonopropionic acid derivatives, those of the formula (3) 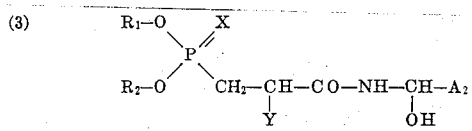

wherein $A_2$ denotes a dihalogenomethyl or preferably trihalogenomethyl radical, and $R_1$, $R_2$, X and Y have the indicated meaning, are preferred.

Very suitable compounds are above all phosphonopropionic acid derivatives of the formula (4) 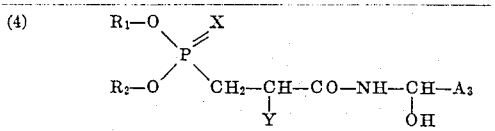

wherein $A_3$ denotes a trihalogenomethyl radical, and $R_1$, $R_2$, X and Y have the indicated meaning.

The phosphonopropionic acid amide derivatives above all correspond to the formula (5) 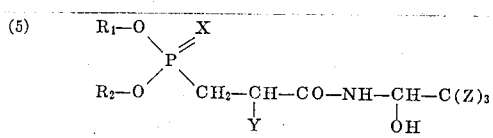

wherein $R_1$, $R_2$, X and Y have the indicated meaning and Z denotes a halogen atom.

Preferred phosphonopropionic acid amide derivatives correspond to the formula (6) 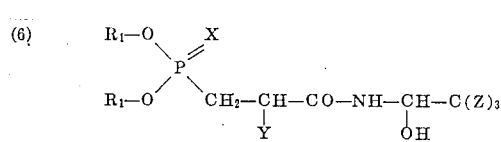

wherein $R_1$, X, Y and Z have the indicated meaning.

Compounds of particular interest are phosphonopropionic acid amide derivatives of the formula (7) 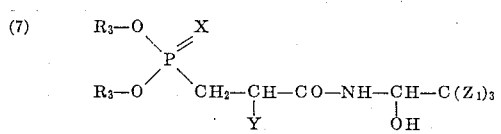

wherein $R_3$ denotes an ethyl radical or especially a methyl radical and $Z_1$ denotes a chlorine or bromine atom, and X and Y have the indicated meaning.

Particularly advantageous phosphonopropionic acid amide derivatives correspond to the formula (8) 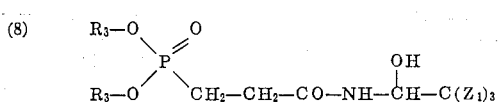

wherein $R_3$ and $Z_1$ have the indicated meaning.

Amongst the phosphonopropionic acid amide derivatives, those of the formula (9) 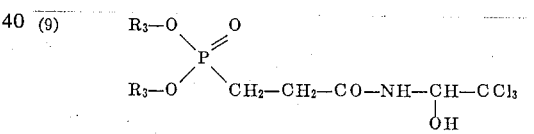

wherein $R_3$ has the indicated meaning, enjoy particular preference, and amongst these above all the compound of the formula

(10) 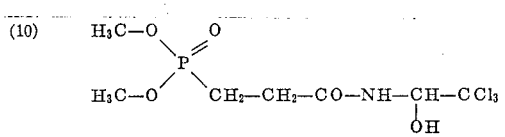

In Formulae (1) to (5), $R_1$ and $R_2$ can thus be identical or different from one another. Preferably, $R_1$ and $R_2$ denote two identical radicals of the indicated composition, as is for example implied in the Formula (6). n-Butyl, n-propyl, isopropyl, ethyl, methyl, allyl or chloroalkyl groups, such as 2-chloroethyl or 2,3-dichloropropyl groups, may be mentioned as examples. Ethyl radicals, and above all methyl radicals, are preferred.

The radicals A, $A_1$, $A_2$ and $A_3$ are as a rule substituted by bromine or especially by chlorine atoms.

The halogen atoms Z in the Formulae (5) and (6) are also preferably bromine atoms or especially chlorine atoms.

The phosphonopropionic acid amide derivatives of the formula (1) are appropriately manufactured by reacting a) a phosphonopropionic acid amide of the formula

(11) 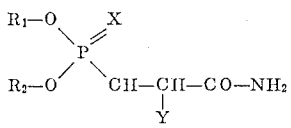

wherein $R_1$, $R_2$, X and Y have the indicated meaning, with b) a halogenoaldehyde of the formula

(12) 

or its hydrate, in an inert organic solvent, at elevated temperature, for example at 50° to 150°C. The components a) and b) are here as a rule reacted with one another in a molar ratio of 1:1. Preferably, the reaction temperature is 70° to 120°C. Possible inert organic solvents, that is to say solvents which do not undergo reactions with the reactants are for example aromatic hydrocarbons such as xylene, toluene or especially benzene. The reaction is appropriately allowed to take place at the boiling point of the solvent used.

To manufacture the phosphonopropionic acid amide derivatives of the Formula (2) to (5), phosphonopropionic acid amides of the Formula (11) are again used, and correspondingly, to manufacture phosphonopropionic acid amide derivatives of the Formula (6), phosphonopropionic acid amides of the formula

(13) 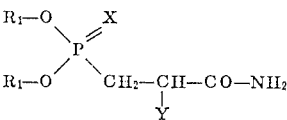

wherein $R_1$, X and Y have the indicated meaning, are used.

The phosphonopropionic acid amide derivatives of the Formulae (7) to (9) are manufactured from phosphonopropionic acid amides of the formula

(14) 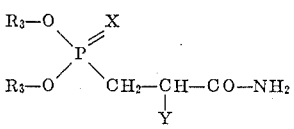

or

(15) 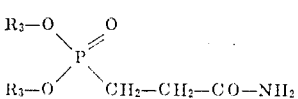

wherein $R_3$, X and Y have the indicated meaning.

The preferred compound of the Formula (10) is manufactured using 3-(dimethylphosphonopropionic acid amide).

The halogenoaldehydes to be used for the manufacture of the compounds of the Formulae (2) to (4) correspond to the formulae (16)

$$\underset{H}{\overset{O}{\diagdown}}C-A_1,$$

(17)

$$\underset{H}{\overset{O}{\diagdown}}C-A_2$$

and (18)

$$\underset{H}{\overset{O}{\diagdown}}C-A_3$$

wherein $A_1$, $A_2$ and $A_3$ have the indicated meaning. Where the halogenoaldehydes are capable of forming stable hydrates, the corresponding hydrates can also be used instead of the free aldehydes in the manufacture of the phosphonopropionic acid amide derivatives. In particular, halogenoacetaldehydes, such as chloral or bromal, are capable of forming stable hydrates.

To manufacture the compound of the Formulae (7) and (8), the aldehydes of the formula

(19) 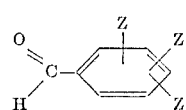

or

(20) 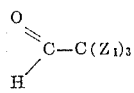

wherein Z and $Z_1$ have the indicated meaning, are used. The aldehyde of the Formula (20) can advantageously also be used as the hydrate. The compounds of the Formulae (9) and (10) are manufactured from chloral or chloral hydrate by reaction with the corresponding phosphonopropionic acid amide.

The compounds of the Formulae (1) to (10) can be employed in the most diverse fields, for example as flameproofing agents or pesticides. They can however also be used as intermediate products in the manufacture of other valuable compounds, since further reactions can be carried out at the hydroxyl group, or possibly also at the —NH— group, or the halogen atoms can be replaced by other substituents.

If the compounds are used as flameproofing agents, cellulose-containing fibre materials, for example, can be provided with a flameproof finish. Possible fibre materials are, for example, linen, cotton, rayon, viscose staple or fibre mixtures of such materials with others, such as wool, polyamide fibres or polyester fibres.

Appropriately, compounds of the Formula (1) are used as solutions in organic solvents such as dimethylformamide or trichloroethylene.

Another possibility for using the compounds of the Formula (1) as flameproofing agents consists of incorporating them directly into the spinning composition of, for example, polyacrylonitrile. The phosphonopropionic acid amide derivatives can furthermore also be used for flameproofing polyurethanes, polystyrene, polyvinyl chloride, polyvinylidene copolymers or polyolefines, such as polyethylene or polypropylene, by incorporating them into the composition of these polymers.

The percentages and parts in the examples which follow are units by weight, unless otherwise stated. The relationship of parts by volume to parts by weight is as of ml to g.

EXAMPLE 1

90.5 parts (0.5 mol) of 3-(dimethylphosphono)-propionic acid amide and 82.75 parts (0.5 mol) of chloral hydrate are suspended in 175 parts of benzene, and heated to the boiling point of the benzene, in a stirred flask of 500 parts by volume capacity, equipped with a water separator, reflux condenser and thermometer. Over the course of 3 hours, 10 parts of water, originating from the chloral hydrate, are trapped in the water separator. When the separation of water is complete, the mixture is treated at the reflux temperature for a further 15 hours. After cooling, the crystalline reaction product which has precipitated is filtered off, rinsed with a little ether and dried.

Yield: 146 parts (89 percent of the theory), melting point 133 to 135°C (decomposition).

A sample of the crude product is recrystallised from methanol and dried over phosphorus pentoxide.

Melting point 140° to 141°C (decomposition).

Elementary analysis confirms that the product obtained corresponds to the Formula (10).

EXAMPLE 2

133 parts (0.5 mol) of 3-(dibutylphosphono)-propionic acid amide and 82.75 parts (0.5 mol) of chloral hydrate in 210 parts of benzene are treated analogously to Example 1, in the apparatus described in Example 1. After completion of the reaction, the benzene is removed by distilling it off in vacuo. 203 parts of a yellowish, highly viscous product corresponding to the following formula are obtained:

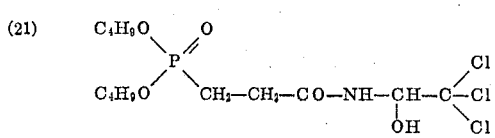

EXAMPLE 3

87 parts (0.48 mol) of 3-(dimethylphosphono)-propionic acid amide and 135 parts of bromal (0.48 mol) in 175 parts of benzene are treated for 4½ hours at the reflux temperature (78°C), in a stirred flask of 500 parts by volume capacity, equipped with a reflux condenser and thermometer. The reaction product separates out as a brownish-coloured viscous mass. After distilling off the benzene, the crude product is recrystallised from isopropanol.

The compound of the formula

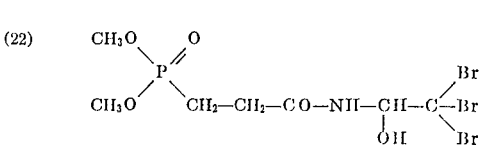

is obtained as a white powder.

EXAMPLE 4

139 parts (0.5 mol) of 3-[di-(chloroethyl)phosphono] propionic acid amide and 82.75 parts of chloral hydrate (0.5 mol) are suspended in 250 parts of toluene, and heated to the boiling point of the toluene, in the apparatus described in Example 1. 11 parts of water are collected in the water separator over the course of 35 minutes. Thereafter the mixture is cooled to room temperature, 200 parts by volume of methanol are added, and the solution is freed of insoluble constituents by filtration. Thereafter, the toluene-methanol mixture is removed in vacuo at 50°C.

203 parts of a yellowish viscous paste are obtained; this crystallises completely after a few days, and corresponds to the product of the following formula

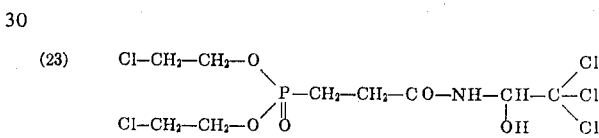

EXAMPLE 5

116 parts (0.5 mol) of 3-(diallylphosphono)propionic acid amide and 82.75 parts of chloral hydrate (0.5 mol) are suspended in 250 parts of benzene, and heated to the boiling point of the benzene, in the apparatus described in Example 1. 9 parts of water are obtained over the course of 2 hours 40 minutes. Thereafter the mixture is cooled to room temperature, 100 parts by volume of methanol are added, and the solution is freed of insoluble constituents by filtration. Thereafter, the benzene-methanol mixture is removed in vacuo at 50°C. 191 parts of a yellowish, viscous product, corresponding to the product of the following formula, are obtained:

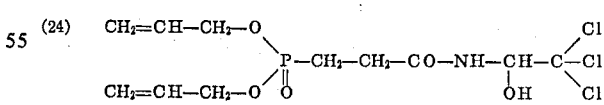

EXAMPLE 6

97.5 parts of 3-(dimethylphosphono)-2-methylpropionic acid amide (0.5 mol) and 82.75 parts of chloral hydrate (0.5 mol) are suspended in 250 parts of benzene, and heated to the boiling point of the benzene, in the apparatus described in Example 1. 10 parts of water are obtained over the course of 1 hour. Thereafter, the mixture is cooled to room temperature, 100 parts by volume of methanol are added, and the solution is freed of insoluble constituents by filtration. Thereafter, the benzene-methanol mixture is removed in vacuo at 50°C. 187 parts of a light beige viscous product are obtained, which contains 10 percent of residual solvent, and the product of the following formula:

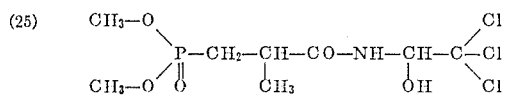

(25)

EXAMPLE 7

98.5 parts (0.5 mol) of 3-(dimethyl-thiophosphono)-propionic acid amide and 82.75 parts (0.5 mol) of chloral hydrate are suspended in 250 parts of benzene, and heated to the boiling point of the benzene, in the apparatus described in Example 1. Nine parts of water are obtained over the course of 70 minutes. Therafter the mixture is cooled to room temperature, 150 parts by volume of methanol are added, and the solution is freed of insoluble constituents by filtration. Therafter, the benzene-methanol mixture is removed in vacuo at 50°C. 165 parts of a yellow, partly crystalline viscous product, corresponding to the following formula, are obtained:

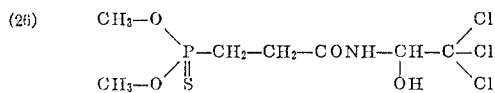

(26)

Use Examples

EXAMPLE 8

30 parts of the product according to Example 1 are dissolved in 70 parts of dimethylformamide at room temperature, and a woven cotton strip is impregnated with this solution and dried at 100°C. The fabric possesses excellent flame-proof properties according to DIN 53,906.

EXAMPLE 9

40 parts of the product according to Example 2 are dissolved in 60 parts of trichloroethylene at room temperature, and a woven cotton fabric is padded with this solution. Thereafter it is dried at 80° to 100°C.

The fabric possesses a 43 percent deposit of shrink-proofing agents and shows a soft handle. The flame-proofing effect according to DIN 53,906 is good.

EXAMPLE 10

30 parts of the product according to Example 3 are dissolved in 70 parts of dimethylformamide, and a woven polyester-cotton fabric (50:50 mixture) is padded with this solution. Thereafter it is dried at 100°C.

The fabric possesses a 45 percent deposit of flameproofing agent. The flameproofing effect according to DIN 53,906, at an ignition time of 12 seconds, is excellent.

EXAMPLE 11

A product of the Formula (13) according to Example (1), which is in the form of a white powder, is incorporated into a spinning composition of polyacrylonitrile in dimethylformamide. The amount employed is 70 percent, relative to polyacrylonitrile.

The film produced from the spinning composition is slightly opaque and can only be ignited with difficulty.

EXAMPLE 12

4.4 g of the compound of the Formula (10) are stirred into a polyurethane coating composition of 40 g of isocyanate-modified polyester, 2 g of reaction accelerator and 2 g of polyfunctional isocyanate as a crosslinking agent. This mixture is knife-coated onto a woven cotton fabric provided with a flameproof finish (wet film thickness 1 mm) and is subsequently dried at 25°C. A colourless, heat-resistant (5 minutes at 100°C) coating is produced. The fabric thus coated is tested for flameproof properties according to DIN 53,906. The ignition time is 6 seconds and the samples are 15 cm long. At the same time, a coating without addition of the compound of the Formula (10) is also tested.

| Flameproof properties | Without addition | With addition of the compound of the Formula (10) |
|---|---|---|
| Burning time (seconds) | 30 | 15 |
| Tear length (cm) | 0 | 4.25 |

The compound of the Formula (10) causes immediate extinction of the sample when the igniting flame is removed.

EXAMPLE 13

A woven cotton fabric already provided with a flameproof finish is coated by the "release process" with the following polyurethane preparations:

| Constituents | Preparation No. | | | | |
|---|---|---|---|---|---|
| | 1 | 2 | 3 | 4 | 5 |
| Product of the formula: | | | | | |
| (23) g | 5 | | | | |
| (24) g | | 5 | | | |
| (25) g | | | 5 | | |
| (26) g | | | | | 5 |
| Dimethylformamide/methyl ethyl ketone 1:1 ml | 10 | 10 | 10 | 10 | 10 |
| Thermoplastic polyester-polyurethane resin (30% solution in 1:1, DFM/MEK) | 50 | 50 | 50 | 50 | 50 |

The coated fabric weighs 490 g/m².

After drying, the coating is tested for its flameproof properties as indicated in Example 12. The ignition time is 8 seconds.

| Preparation No. | Subsequent burning time, in seconds | Tear length in cm |
|---|---|---|
| 1 | burns | |
| 2 | 8 | 12 |
| 3 | 1 | 9.5 |
| 4 | 5 | 13 |
| 5 | 3 | 12.5 |

We claim:
1. A phosphonopropionic acid amide derivative of the formula

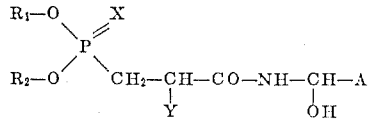

wherein $R_1$ and $R_2$ each denote an alkyl, halogenalkyl or alkenyl radical with up to 4 carbon atoms each, X denotes a sulphur or oxygen atom, Y denotes a methyl group or a hydrogen atom and A denotes a halogenated alkyl radical with 1 to 4 carbon atoms.

2. A phosphonopropionic acid amide derivative according to claim 1 of the formula $$\begin{array}{c} R_1-O \\ R_2-O \end{array} \overset{X}{\underset{}{P}} CH_2-CH-CO-NH-CH-A_2 \\ \phantom{xxxxxxxxxxxxxxx} Y \phantom{xxxxxx} OH$$

wherein $A_2$ denotes a dihalogenomethyl or trihalogenomethyl radical and $R_1$, $R_2$, X and Y have the meaning indicated in claim 1.

3. A phosphonopropionic acid amide derivative according to claim 1 of the formula $$\begin{array}{c} R_1-O \\ R_2-O \end{array} \overset{X}{\underset{}{P}} CH_2-CH-CO-NH-CH-A_3 \\ \phantom{xxxxxxxxxxxxxxx} Y \phantom{xxxxxx} OH$$

wherein $A_3$ denotes a trihalogenomethyl radical and $R_1$, $R_2$, X and Y have the meaning indicated in claim 1.

4. A phosphonopropionic acid amide derivative according to claim 1 of the formula $$\begin{array}{c} R_1-O \\ R_1-O \end{array} \overset{X}{\underset{}{P}} CH_2-CH-CO-NH-CH-C(Z)_3 \\ \phantom{xxxxxxxxxxxxxxx} Y \phantom{xxxxxx} OH$$

wherein Z is a halogen atom.

5. A phosphonopropionic acid amide derivative according to claim 1 of the formula $$\begin{array}{c} R_3-O \\ R_3-O \end{array} \overset{X}{\underset{}{P}} CH_2-CH-CO-NH-CH-C(Z_1)_3 \\ \phantom{xxxxxxxxxxxxxxx} Y \phantom{xxxxxx} OH$$

wherein $R_3$ denotes an ethyl or a methyl radical and $Z_1$ denotes a chlorine or bromine atom, and X and Y have the meaning in claim 1.

6. A phosphonopropionic acid amide derivative according to claim 5 of the formula $$\begin{array}{c} R_3-O \\ R_3-O \end{array} \overset{O}{\underset{}{P}} CH_2-CH_2-CO-NH-CH-C(Z_1)_3 \\ \phantom{xxxxxxxxxxxxxxxxxxxx} OH$$

7. A phosphonopropionic acid amide derivative according to claim 5 of the formula $$\begin{array}{c} R_3-O \\ R_3-O \end{array} \overset{O}{\underset{}{P}} CH_2-CH_2-CO-NH-CH-CCl_3 \\ \phantom{xxxxxxxxxxxxxxxxxxxx} OH$$

8. The compound according to claim 1 of the formula $$\begin{array}{c} H_3C-O \\ H_3C-O \end{array} \overset{O}{\underset{}{P}} CH_2-CH_2-CO-NH-CH-CCl_3 \\ \phantom{xxxxxxxxxxxxxxxxxxxx} OH$$

9. The compound according to claim 1 of the formula $$\begin{array}{c} CH_3-O \\ CH_3-O \end{array} \overset{}{\underset{O}{P}}-CH_2-CH-CO-NH-CH-C\begin{array}{c}Cl\\-Cl\\Cl\end{array} \\ \phantom{xxxxxxxxxxx} CH_3 \phantom{xx} OH$$

10. The compound according to claim 1 of the formula $$\begin{array}{c} Cl-CH_2-CH_2-O \\ Cl-CH_2-CH_2-O \end{array} \overset{}{\underset{O}{P}}-CH_2-CH_2-CO-NH-CH-C\begin{array}{c}Cl\\-Cl\\Cl\end{array} \\ \phantom{xxxxxxxxxxxxxxxxxxxxx} OH$$

11. The compound according to claim 1 of the formula $$\begin{array}{c} C_4H_9O \\ C_4H_9O \end{array} \overset{O}{\underset{}{P}} CH_2-CH_2-CO-NH-CH-C\begin{array}{c}Cl\\-Cl\\Cl\end{array} \\ \phantom{xxxxxxxxxxxxxxxxxxx} OH$$

* * * * *